(12) United States Patent
Leuca

(10) Patent No.: US 9,699,126 B2
(45) Date of Patent: *Jul. 4, 2017

(54) ON-DEMAND SPAM REPORTING

(71) Applicant: AT&T Mobility II LLC, Atlanta, GA (US)

(72) Inventor: Ileana Ana Leuca, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,133

(22) Filed: Jun. 29, 2015

(65) Prior Publication Data
US 2015/0304258 A1    Oct. 22, 2015

Related U.S. Application Data

(63) Continuation of application No. 12/537,365, filed on Aug. 7, 2009, now Pat. No. 9,070,116.

(60) Provisional application No. 61/104,066, filed on Oct. 9, 2008.

(51) Int. Cl.
| | |
|---|---|
| *G06F 15/16* | (2006.01) |
| *H04L 12/58* | (2006.01) |
| *G06Q 10/10* | (2012.01) |
| *H04L 29/06* | (2006.01) |
| *G06N 5/04* | (2006.01) |
| *G06N 5/02* | (2006.01) |
| *G06N 99/00* | (2010.01) |

(52) U.S. Cl.
CPC ............ *H04L 51/12* (2013.01); *G06Q 10/107* (2013.01); *H04L 63/1441* (2013.01); *G06N 5/02* (2013.01); *G06N 5/04* (2013.01); *G06N 99/005* (2013.01)

(58) Field of Classification Search
CPC ....... H04Q 7/20; H04L 51/12; H04L 63/1441; G06Q 10/107; G06N 5/02; G06N 5/04; G06N 99/005

See application file for complete search history.

(56) References Cited

U.S. PATENT DOCUMENTS

| | | | |
|---|---|---|---|
| 6,393,465 | B2 | 5/2002 | Leeds |
| 7,295,833 | B2 | 11/2007 | Agrawal et al. |
| 7,343,624 | B1 | 3/2008 | Rihn et al. |

(Continued)

OTHER PUBLICATIONS

"F-Secure Mobile Anti-Virus for 860 User's Guide" 2004.

*Primary Examiner* — Suraj Joshi
*Assistant Examiner* — Jaren M Means
(74) *Attorney, Agent, or Firm* — Baker & Hostetler LLP

(57) ABSTRACT

A device is configured to report spam on demand. The spam is reported to a spam reporting service center in a communications network. As content is received by the device, the user of the device analyzes the content to determine if the content comprises spam. If the user determines that the content comprises spam, the user triggers the device to report the spam. The content can be of any type of content or combinations of content type, such as SMS, SMS, VM, email, VVM, VVM, and advertisements. The device comprises multiple clients configured to processes, respectively, each content type. In response to receiving the trigger, the appropriate client encapsulates the content. The encapsulated content is sent to a Report Spam client to generate a spam report. The spam report includes the encapsulated content and a disposition instruction.

20 Claims, 11 Drawing Sheets

(56) References Cited

U.S. PATENT DOCUMENTS

| | | | |
|---|---|---|---|
| 7,437,760 B2 | 10/2008 | Dettinger et al. | |
| 2004/0260922 A1* | 12/2004 | Goodman | G06Q 10/107 |
| | | | 713/154 |
| 2005/0015454 A1 | 1/2005 | Goodman et al. | |
| 2005/0060638 A1* | 3/2005 | Mathew | G06Q 10/06 |
| | | | 715/255 |
| 2005/0227678 A1 | 10/2005 | Agrawal et al. | |
| 2005/0278620 A1* | 12/2005 | Baldwin | H04L 51/12 |
| | | | 715/201 |

* cited by examiner

ON-DEMAND SPAM REPORTING

CROSS REFERENCE TO RELATED APPLICATIONS

This application is a continuation of U.S. patent application Ser. No. 12/537,365, filed Aug. 7, 2009, which claims priority to U.S. Provisional Patent Application No. 61/104,066, entitled "ON-DEMAND SPAM REPORTING," filed Oct. 9, 2008, the contents of which are hereby incorporated by reference in their entirety.

TECHNICAL FIELD

The technical field generally relates to reporting spam from a mobile device.

BACKGROUND

Spam is a ubiquitous problem. Reducing the impact of spam, especially security risk impacts, is extremely important in the realm of mobile devices. The typically compact operating system and a relatively small memory capacity of a mobile device make mobile devices especially vulnerable to spam. Further, mobile devices are being used to conduct financial transactions, which also makes a mobile device vulnerable to spam. Mobile devices also are susceptible to potential loss of service of other co-existing applications in the mobile device as a result of spam.

SUMMARY

In an example, a device is configured to provide on-demand spam reporting to a network spam reporting service center. Spam is defined as any content containing unwanted information (e.g., virus, objectionable information such an advertisement, etc.), or any content that is unwanted (although the information contained in the content is not necessarily unwanted), such a large number of copies of the same email, or content having large file sizes. Spam can be in the form of any type of content. In an example, content such as Short Message Service (SMS) content, Multimedia Message Service (MMS) content, Email (EM) content, Voice Mail (VM) content, Video Voice Mail (VVM) content, Advertisement (AD) content, and/or Video Share (VS) content, for example, is pushed by a network to a mobile device and the subscriber is alerted. Upon inspection, the subscriber determines that the newly arrived content fits his/her criteria of spam and decides to report it as such. Within the mobile device, the subscriber's command sends a reporting trigger to a content processing application requesting it to prepare a package containing the offending content, and, for example, including the originator's and sender's data, type of content, and subscriber specific data. The subscriber's command also results in the package being sent as a spam report to a predetermined network destination. Spam reporting is described herein with respect to a mobile device in a wireless network, however, it is to be understood that applications of spam reporting are not limited thereto. Accordingly, on-demand spam reporting, as described herein, is applicable to any appropriate device in any appropriate environment.

BRIEF DESCRIPTION OF THE DRAWINGS

The following description is better understood when read in conjunction with the appended drawings.

DESCRIPTION OF ILLUSTRATIVE EMBODIMENTS

Figure 1:
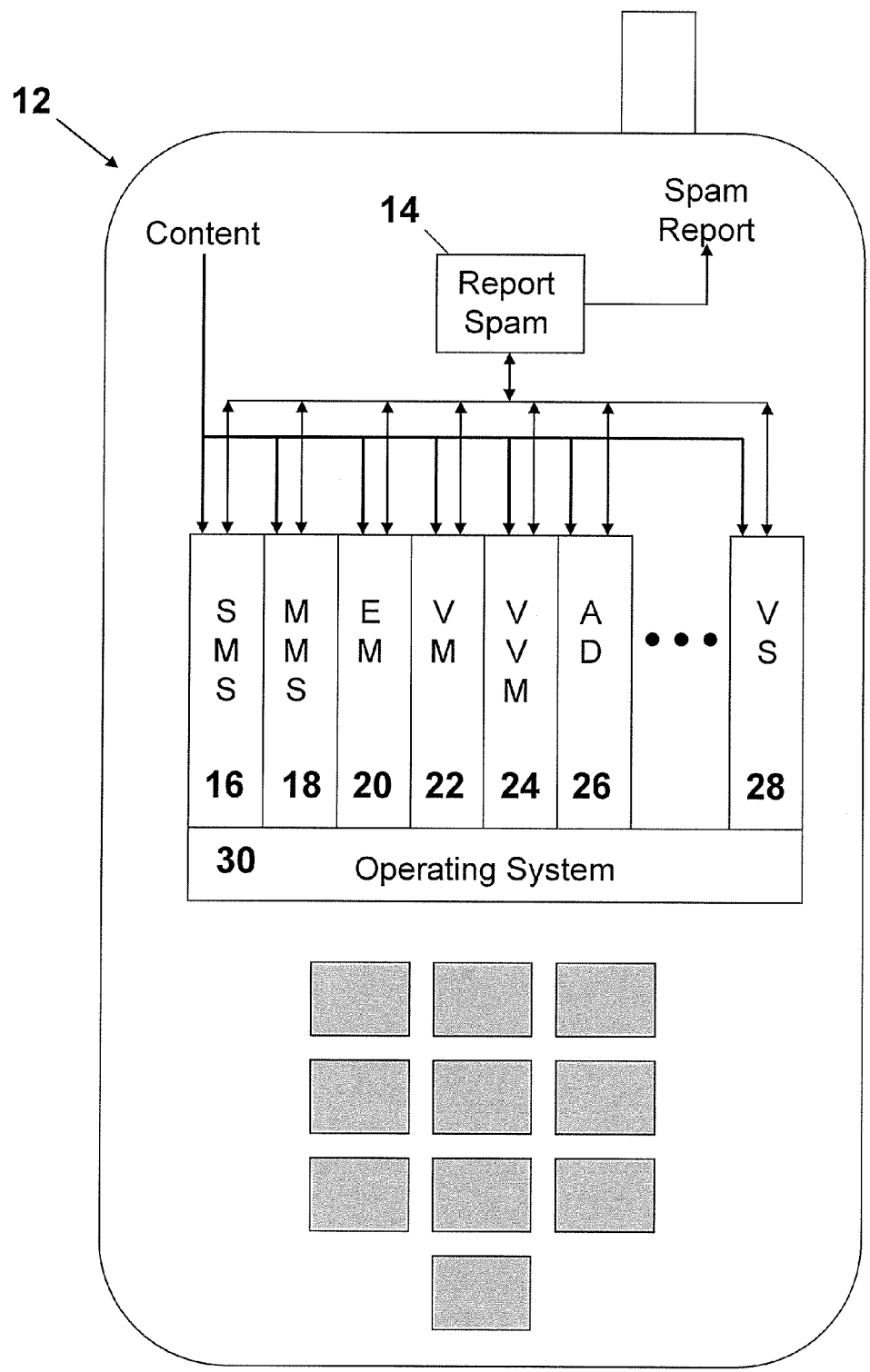
FIG. 1 is a diagram depicting an example communications device configured to implement on-demand spam reporting.

FIG. 1 is a diagram depicting an example communications device 12 configured to implement on-demand spam reporting. The communications device 12 can comprise a mobile device or a stationary device. The communications device 12, can include, for example, a portable media player, a portable music player, such as an MP3 player, a Walkman, a portable computing device, such as a laptop, a personal digital assistant ("PDA"), a portable phone, such as a cell phone or the like, a smart phone, a Session Initiation Protocol (SIP) phone, a video phone, a portable email device, a portable gaming device, a consumer electronic device, such as a TV, a DVD player, a set top box, a public computing device, such as a kiosk, an in-store music sampling device, an automated teller machine (ATM), a cash register, a navigation device whether portable or installed in-vehicle and/or a non-conventional computing device, non-conventional computing devices, such as a kitchen appliance, a motor vehicle control (e.g., steering wheel), or a combination thereof.

In an example configuration, the communications device 12 comprises a plurality of clients. As depicted, the example communications device 12 comprises a Report client, such as, for example, Report Spam client 14, an SMS client 16, a MMS client 18, an EM client 20, a VVM client 24, an AD client 26, and a VS client 28, each in operational communication with an operating system 30 of the communications device 12. It is to be understood that the clients depicted in FIG. 1 is exemplary and not intended to be limiting. That is, the communications device 12 can include more or less clients than depicted in FIG. 1, the number of each client can differ from the depiction in FIG. 1, and the types of clients can differ from the depiction in FIG. 1.

In an example embodiment, each of the clients 16, 28, 20, 22, 24, 26, and 28, of the communications device 12 for each application/content type, SMS, MMS, EM, VM, VVM, AD, and VS, respectively, is configured to encapsulate the spam for each content type of the client. The content is encapsulated to the device to safely handle the content and to allow the content to be provided to a reporting center while reducing the possibility of the content harming the device or any network component. The content can be encapsulated in any appropriate manner. For example, the content can be encapsulated by encrypting the content, obfuscating the content, etc. The encapsulated spam content is provided to the Report Spam client 14. The report spam client 14 generates a package, including the spam content received from each client and other information as described in more detail below.

In an example embodiment, the communications device 12 is configured to allow a subscriber to initiate spam reporting, build a spam report, and provide the spam report to a network spam reporting service center (e.g., via an IP address, point-to-point communication, broadcast, or the like). When the subscriber determines that content contains (or may contain) spam, the subscriber, via a user interface (UI) of the communications device 12, sends a trigger command to the Report Spam client 14. The Report Spam client 14 instructs each client of the communications device 12 to encapsulate the received spam content and send it to the Report Spam client 14. The Report Spam client 14 generates the spam report package to be sent to the spam reporting service center. Spam can be of any content type, for example, text (SMS), multimedia (MMS), email, video, voice mail, visual voice mail, advertisements, or any combination thereof.

Figure 2:
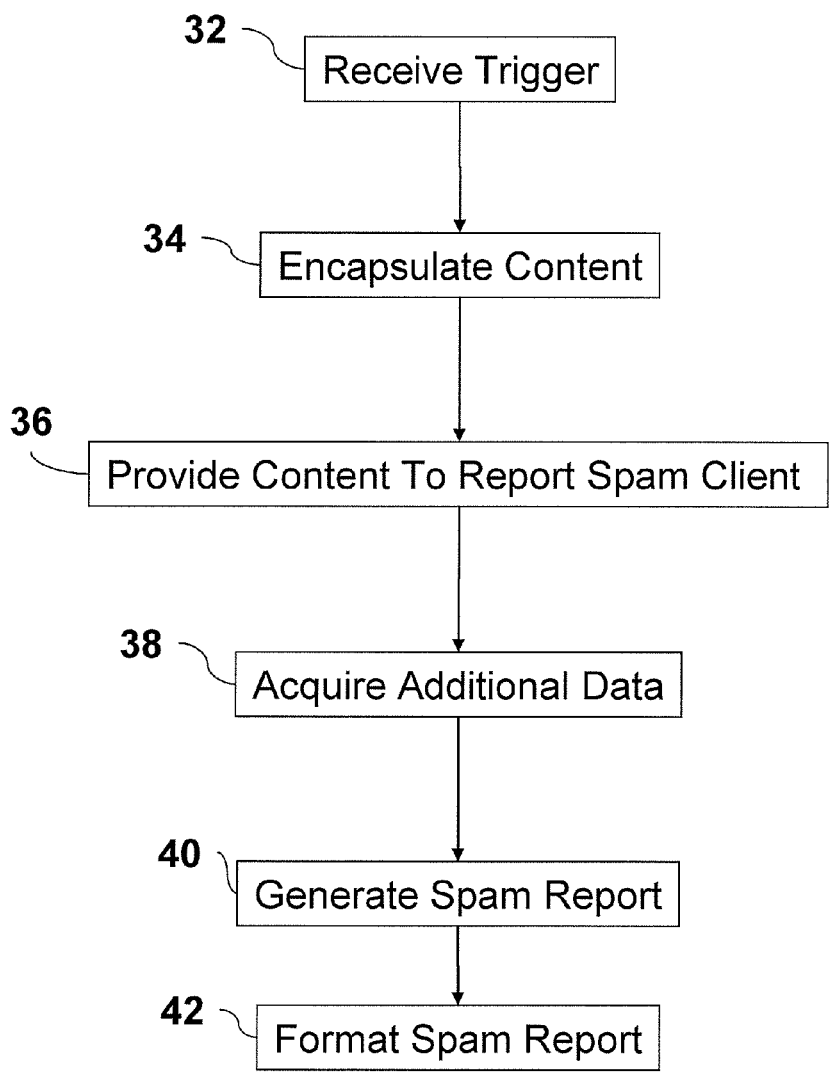
FIG. 2 is a flow chart of an example process for generating a spam report via a communications device.

FIG. 2 is a flow chart of an example process for generating a spam report via a communications device. The process depicted in FIG. 2 is described with reference to device 12 as depicted in FIG. 1 for the sake of simplicity. It is to be understood that the process of FIG. 2 is not limited to the structure depicted in FIG. 1.

A trigger is received by a client of the mobile device at step 32. In an example embodiment, the trigger is provided via a user interface of the device 12. When the user of the device determines that content received by the device contains spam, or could possibly contain spam, the user triggers the device to generate a spam report. The trigger can be provided in any appropriate manner. For example, the user can depress a button on the device to trigger spam reporting, the user can select a soft key on the device to trigger spam reporting, the user can provide a voice command to trigger voice command, or any combination thereof. In various example embodiments, the trigger can be directly received by the Report Spam client 14, the trigger can be received by the Report Spam client 14 via the operating system 30 of the device 12, or a combination thereof. The received content is encapsulated by the respective client, or clients, of the content type at step 34. Thus, if the received content is an SMS message, the SMS client 16 encapsulates the content, if the received content is an MMS message, the MMS client 18 encapsulates the content, if the received content is an email message, the EM client 20 encapsulates the content, if the received content is a voice mail message, the VM client 22 encapsulates the content, if the received content is a video voice mail message, the VVM client 24 encapsulates the content, if the received content is an advertisement, the AD client 26 encapsulates the content, and if the received content is video share media, the VS client 28 encapsulates the content, or any combination thereof. Thus, content can be received of various types that contain spam, and accordingly, all content types are encapsulated. The content is encapsulated to protect the device 12 from any harmful effects of the content.

The encapsulated content is provided to the Report Spam client 14 at step 36. The Report Spam client 14 obtains additional data to generate the spam report at step 38. This additional data can include for example, subscriber data (e.g., the International Mobile Subscriber Identity (IMSI)), selected message data (e.g., Message Content Type(s), Original Sender's address, Last Sender's address), and a disposition instruction (e.g., Block further messages from the original and/or last sender, report only). The spam report is generated using the obtained data and the content at step 40, and the spam report is formatted at step 42. As described in more detail below, the spam report is formatted to facilitate transmission to the spam reporting service center.

Figure 3:
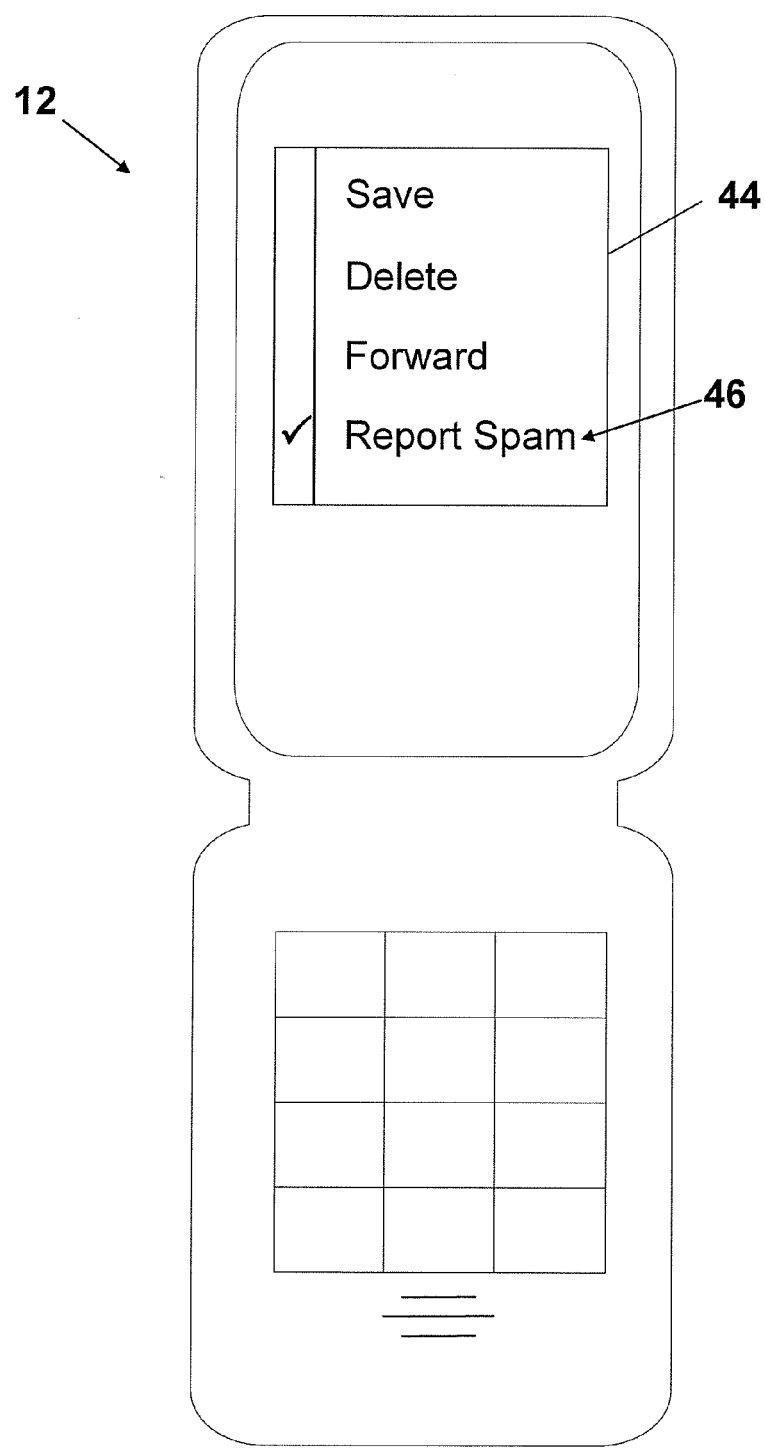
FIG. 3 is another depiction of the communications device indicating optional selections via the user interface (UI) of the communications device.

FIG. 3 is another depiction of the communications device 12 indicating optional selections via the user interface (UI) of the communications device 12. In an example embodiment, the UI of the mobile device comprises a report spam option 46, which can accompany current options such as Save, Delete, Forward, etc. The report spam options can be part of a drop down menu 44, or the like. For voice mail, in an example embodiment, the spam reporting option is added as part of an audio UI provided by the voice mail client 22. Upon selection by the subscriber of the report spam option, indicated, for example, by the check mark shown in FIG. 2, a build spam report function is triggered. In an example embodiment, the spam report includes a disposition instruction.

Figure 4:
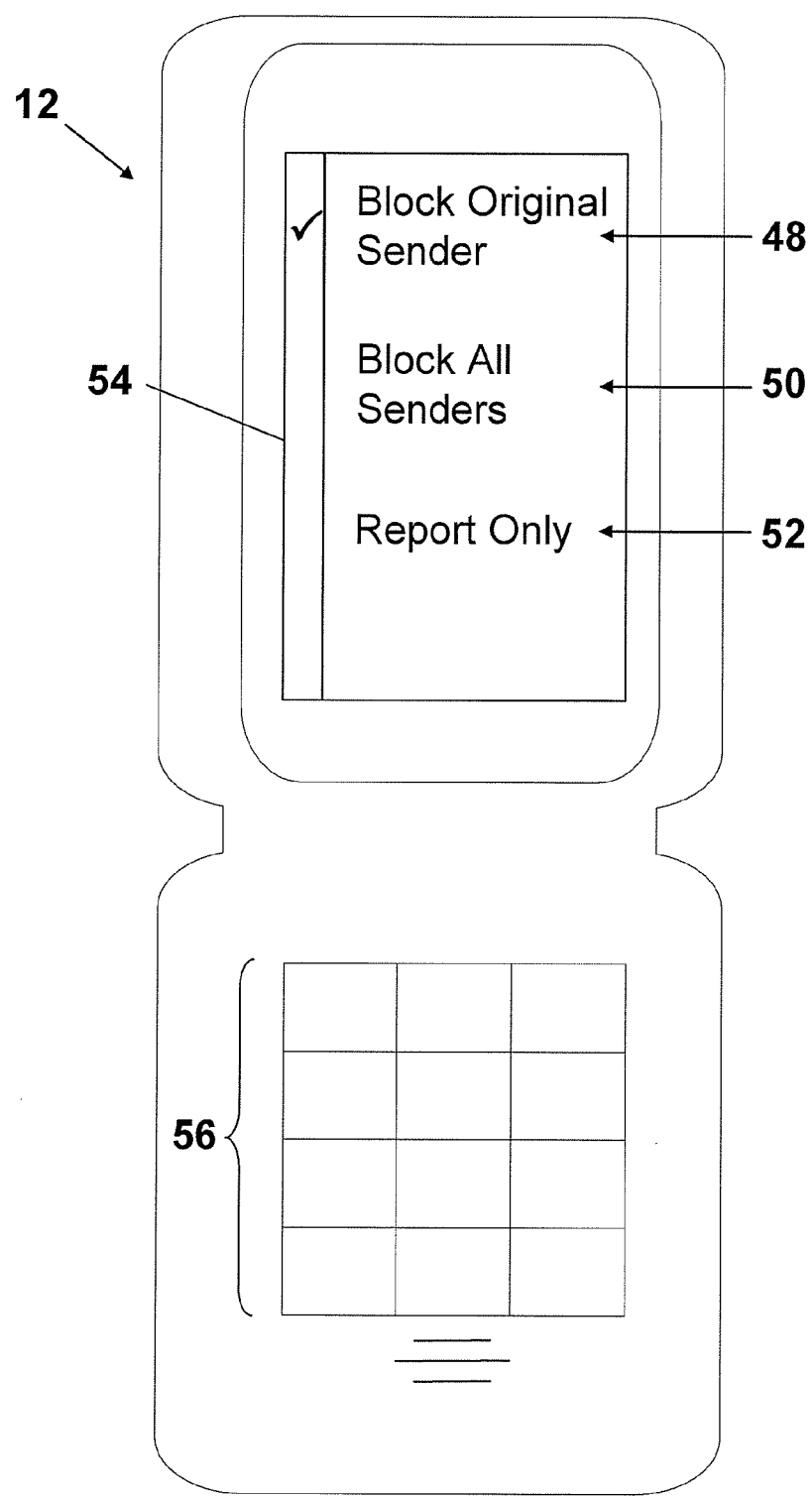
FIG. 4 is a depiction of an example UI for selecting a disposition instruction for the spam report.

FIG. 4 is a depiction of an example UI for selecting a disposition instruction for the spam report. The user can choose any appropriate disposition instruction. In an example embodiment, the user can choose, via the drop down menu 54, to block email coming from the original sender 48, block email coming from all senders of the spam 50, or just report the spam 52. The disposition instruction can be selected via a drop down menu 54 as depicted in FIG. 4, via a voice command, via a keypad 56, or any combination thereof. It is to be understood that the depiction shown in FIG. 4 is exemplary and not intended to be limiting. Any number or type of disposition instruction can be implemented to build a spam report.

Figure 5:
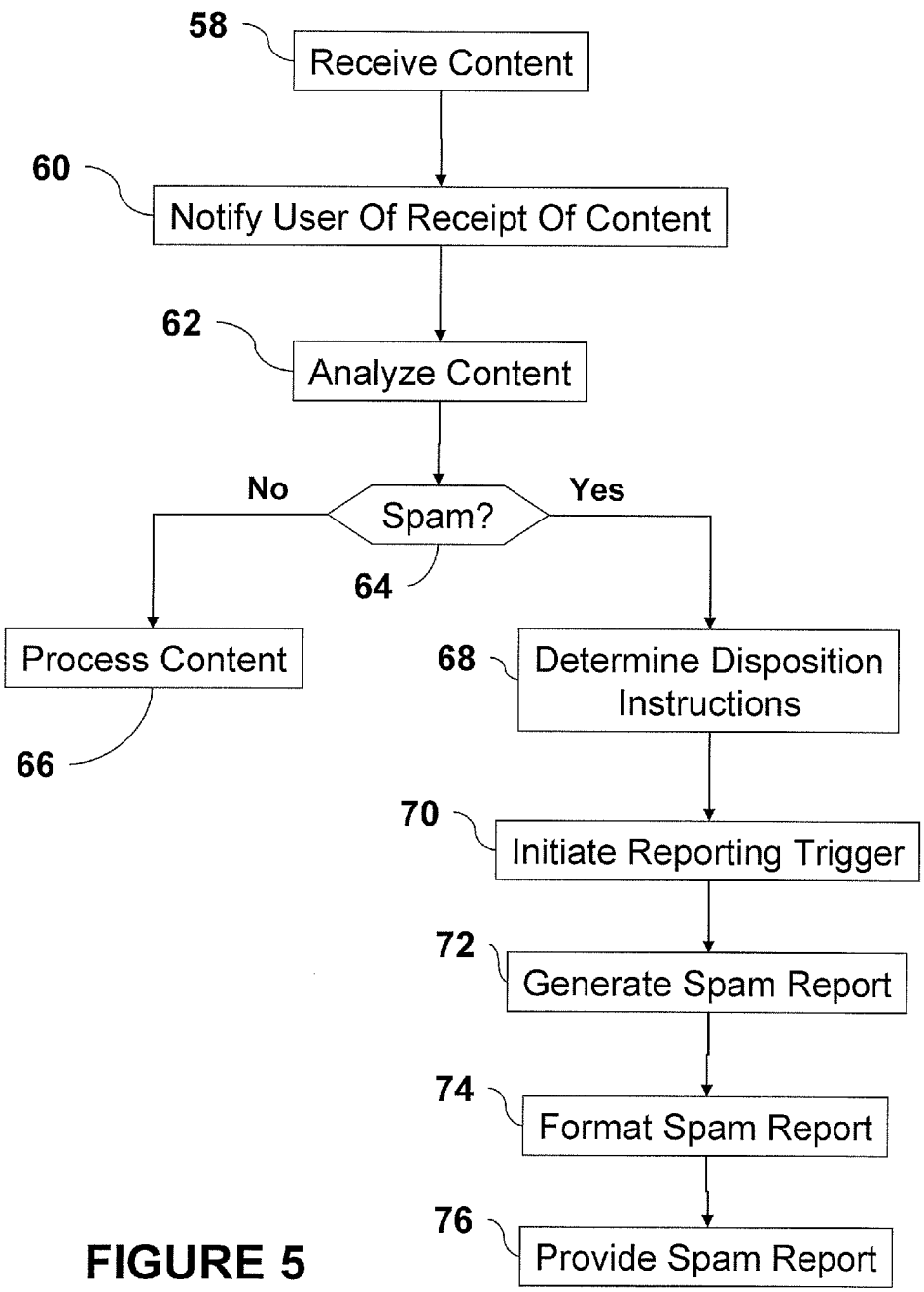
FIG. 5 is a flow diagram of an example process for performing on-demand spam reporting.

FIG. 5 is a flow diagram of an example process for performing on-demand spam reporting. The content is received, by the mobile device for example, at step 58. The user of the device is notified of the receipt of content at step 60. The user can be notified in any appropriate manner, such as, for example via the UI of a device. The user analyzes the content at step 62 to determine if the content contains spam or is suspected to contain spam. And, at step 64 it is determined if the content contains spam or is suspected of containing spam. In an example embodiment, the content is analyzed (at step 62) via security software (e.g., Spyware, virus detection software, etc.), for example. And, the user determines if the content contains spam, or not, via the software. In yet another embodiment, the content is automatically analyzed (at step 62) and the determination is made without user intervention. If it is determined that the content does not contain spam and is not suspected of containing spam (at step 64), the content is processed/handled, as normal, by the device at step 66. If it is determined that the content does contain spam or is suspected of containing spam (at step 64), disposition instructions are determined at step 68. Deposition instructions can be determined in any appropriate manner, such as, for example, via selection a UI of the device as described above.

In an example embodiment, generation of the disposition instruction does not require subscriber intervention. Rather, disposition instructions are automatically generated based on the subscriber profile of the user. That is, the user can preprogram the device to provide predetermined disposition instruction whenever spam is received or suspected to have been received.

A spam reporting trigger is initiated at step 70. The trigger can be implemented in any appropriate manner. In various example embodiments, the trigger is implemented via the UI of the device. For example, the user can depress a button on the device to trigger spam reporting, the user can select a soft key on the device to trigger spam reporting, the user can provide a voice command to trigger voice command, or any combination thereof.

A spam report is generated at step 72. In an example embodiment, the spam report is generated by collecting report data, such as, for example, subscriber data (e.g., the International Mobile Subscriber Identity (IMSI)), selected message data (e.g., Message Content Type(s), Original Sender's address, Last Sender's address), the message (content) as received, and disposition instruction (e.g., Block further messages from the original and/or last sender, report only). The report data is formatted in accordance with a determined structure (e.g., any appropriate protocol) at step 74. The spam report is provided to a network entity at step 76. In an example embodiment, a "Send Report" function is invoked, and the spam report is provided to an appropriate spam reporting servicing center. The spam reporting servicing center processes the report. The distinction between the original sender's address and the last sender's address aids the network spam reporting service center to differentiate between genuine spamming and a potential viral infection attack via message contents of any type.

In an example embodiment, the spam report additionally includes the address of the network spam reporting service center. The spam report is provided to the spam reporting service center and the spam reporting service center provides feedback to the device/subscriber. The feedback, from the spam reporting service center to the device, can be provided to the user of the device via the UI of the device. For example, a "Report Sent" message can be displayed on the display of the device, an audible tone can be provide, the device can vibrate, or any combination thereof. In an example embodiment, the user can be prompted for follow-up action, such as a request to delete the message or store the message. And, the user can select the appropriate action (delete or store). In an example embodiment, the device is preconfigured, via the user profile, to automatically delete the message or automatically store the message upon sending the spam report.

In an example embodiment, send capabilities are built into every messaging application and are used to send the package to the specific spam reporting servicing center without the subscriber having to affix the address of the spam reporting servicing center to the package. In an example configuration, the network address of the spam reporting servicing center is provisioned into a dedicated field of the protocol. The network uses content data, e.g., content sender's address, content type, etc., and subscriber's address to initiate blocking of future content delivery from indicated sender to reporting subscriber.

Figure 6:
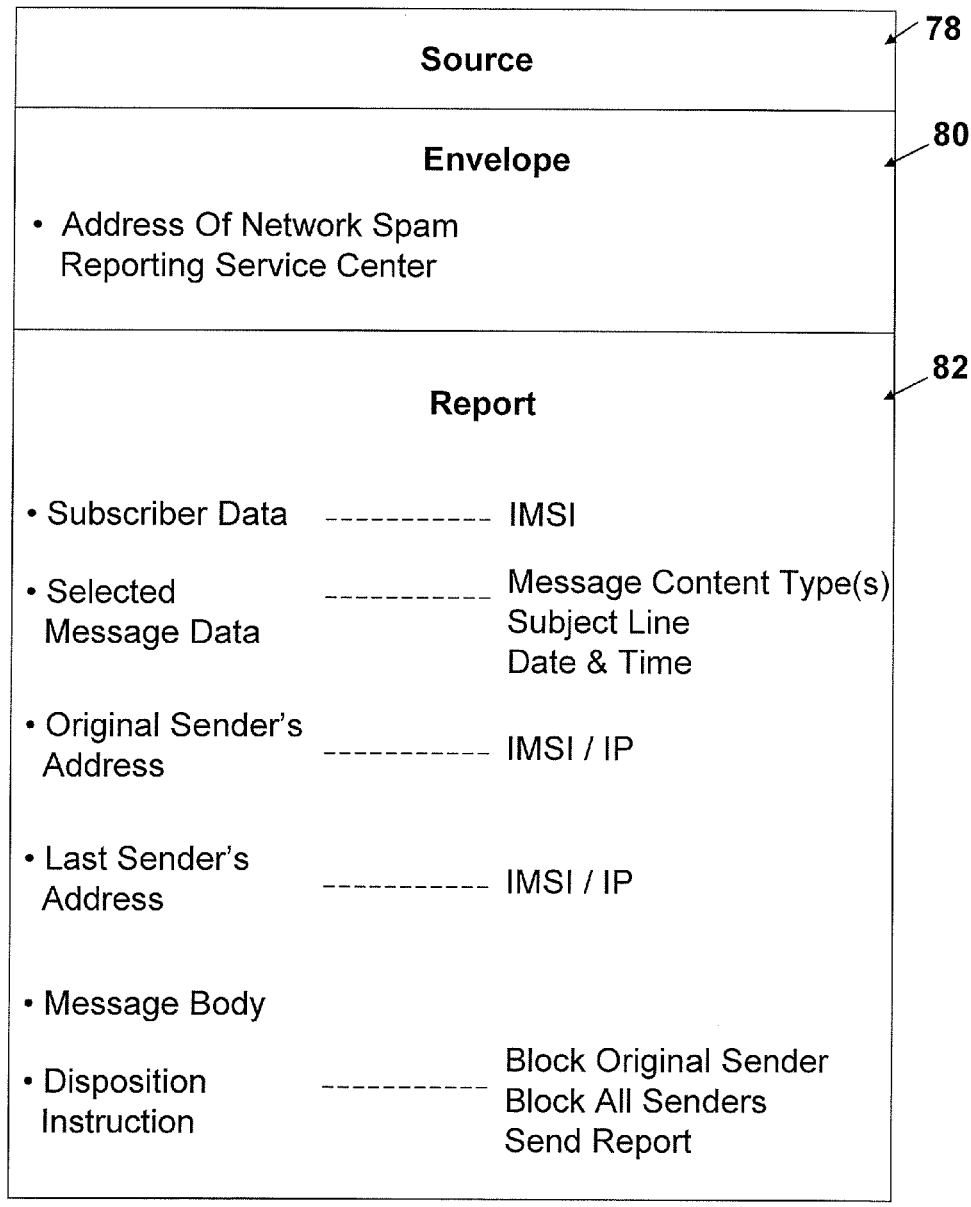
FIG. 6 depicts an example format of a spam report.

FIG. 6 depicts an example format of a spam report. It is emphasized that the spam report format depicted in FIG. 6 is an example, and not intended to be limited thereto. As depicted in FIG. 6, the first portion 78 or the spam report contains an indication of the source of the spam report, such as the phone number of the device, for example. The second portion 80 of the spam report comprises the envelope of the report and contains the address of the network spam reporting service center. This can be an IP address or the like. The third portion 82 of the spam report comprises the report portion. The report portion can contain any appropriate information. In an example embodiment the report portion contains subscriber data such as the IMSI of the subscriber. The report portion also can contain selected message data, such as the message content type, or types, a subject line, a date, and time, the spam report was generated and/or sent. The report portion further can contain the original sender's address (e.g., the original sender's IMSI and/or IP address, FQDN—Fully Qualified Domain Name), the last sender's address (e.g., the last sender's IMSI and/or IP address, FQDN), a message body contain any appropriate message, and a disposition instruction (e.g., block content from the original sender, block content from all senders of the content, or send report only).

Figure 7:
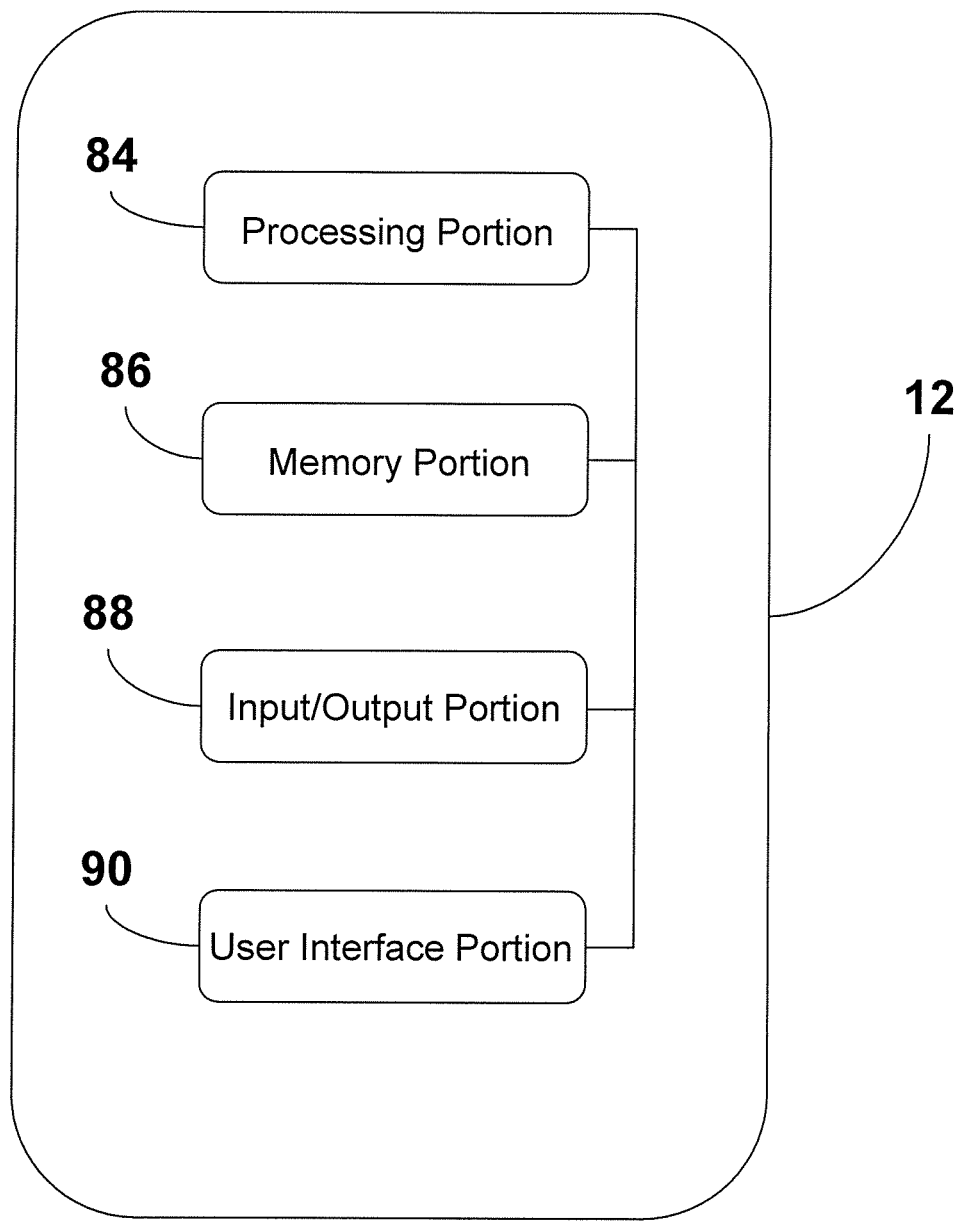
FIG. 7 is a functional block diagram of an example device.

FIG. 7 is a functional block diagram of an example device 12. The example device 12 can include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The device 12 can include devices that are not typically thought of as portable, such as, for example, a public computing device, a navigation device installed in-vehicle, a set top box, or the like. The device 12 can include non-conventional computing devices, such as, for example, a kitchen appliance, a motor vehicle control (e.g., steering wheel), etc., or the like.

In an example configuration, the device 12 comprises a processing portion 84, a memory portion 86, an input/output portion 88, and a user interface (UI) portion 90. It is emphasized that the block diagram depiction of device 12 is exemplary and not intended to imply a specific implementation or structure. For example, in an example configuration, the device 12 comprises a mobile phone and the processing portion 84 and/or the memory portion 86 are implemented, in part or in total, on a subscriber identity module (SIM) or universal integrated circuit card (UICC) of the device 12, on a processor and memory of the device 12, other than a SIM or UICC, or a combination thereof.

The processing portion 84, memory portion 86, and input/output portion 88 are coupled together to allow communications therebetween. In various embodiments, the input/output portion 88 comprises a receiver of the device 12, a transmitter of the device 12, or a combination thereof. The input/output portion 88 is capable of receiving and/or providing information in order to support on-demand spam reporting from the device 12 as described above. For example, the input/output portion 88 is capable of receiving content (e.g., SMS content, MMS content, EM content, VM content, VVM content, AD content, VS content), providing a spam report, receiving feedback from the spam reporting service center, or any combination thereof, as described above. In various configurations, the input/output portion 88 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), olfactory means (e.g., activate chemical or chemicals to provide an odor), or a combination thereof. In various configurations, the input/output portion 88 can receive and/or provide information wirelessly, via a wired connection, or a combination thereof.

The processing portion 84 is capable of performing functions to support on-demand spam reporting from the device 12 as described above. For example, the processing portion 84 is capable of notifying a user of receipt of content, analyzing content, determining if content contains spam, determining if content is suspected of containing spam, processing content, determining disposition instructions, initiating a reporting trigger, generating a spam report, formatting a spam report, or any combination thereof.

The memory portion 86 can store any information utilized in conjunction on-demand spam reporting from the device 12. For example, the memory portion 86 is capable of storing subscriber data (e.g., the International Mobile Subscriber Identity (IMSI)), selected message data (e.g., Message Content Type(s), Original Sender's address, Last Sender's address), the message (content) as received, and disposition instruction (e.g., Block further messages from the original and/or last sender, report only), or any combination thereof. Depending upon the exact configuration and type of processor, the memory portion 86 can be volatile (such as dynamic RAM), non-volatile (such as ROM), or a combination thereof. The device 12 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the device 12.

The device 12 also can contain a UI portion 90 allowing a user to communicate with the device 12. The UI portion 90 can provide the ability to control the device 12, via, for example, buttons, soft keys, voice actuated controls, a touch screen, movement of the device 12, visual cues (e.g., moving a hand in front of a camera on the device 12), or the like. The UI portion 90 can provide visual information (e.g., via a display), audio information (e.g., via speaker), mechanically (e.g., via a vibrating mechanism), olfactory information (smell), or a combination thereof. In various configurations, the UI portion 90 can comprise a display, a touch screen, a keyboard, an accelerometer, a motion detector, a speaker, a microphone, a camera, a tilt sensor, or any combination thereof. The UI portion 90 can comprise means for inputting biometric information, such as, for example, fingerprint information, retinal information, voice information, and/or facial characteristic information.

Figure 8:
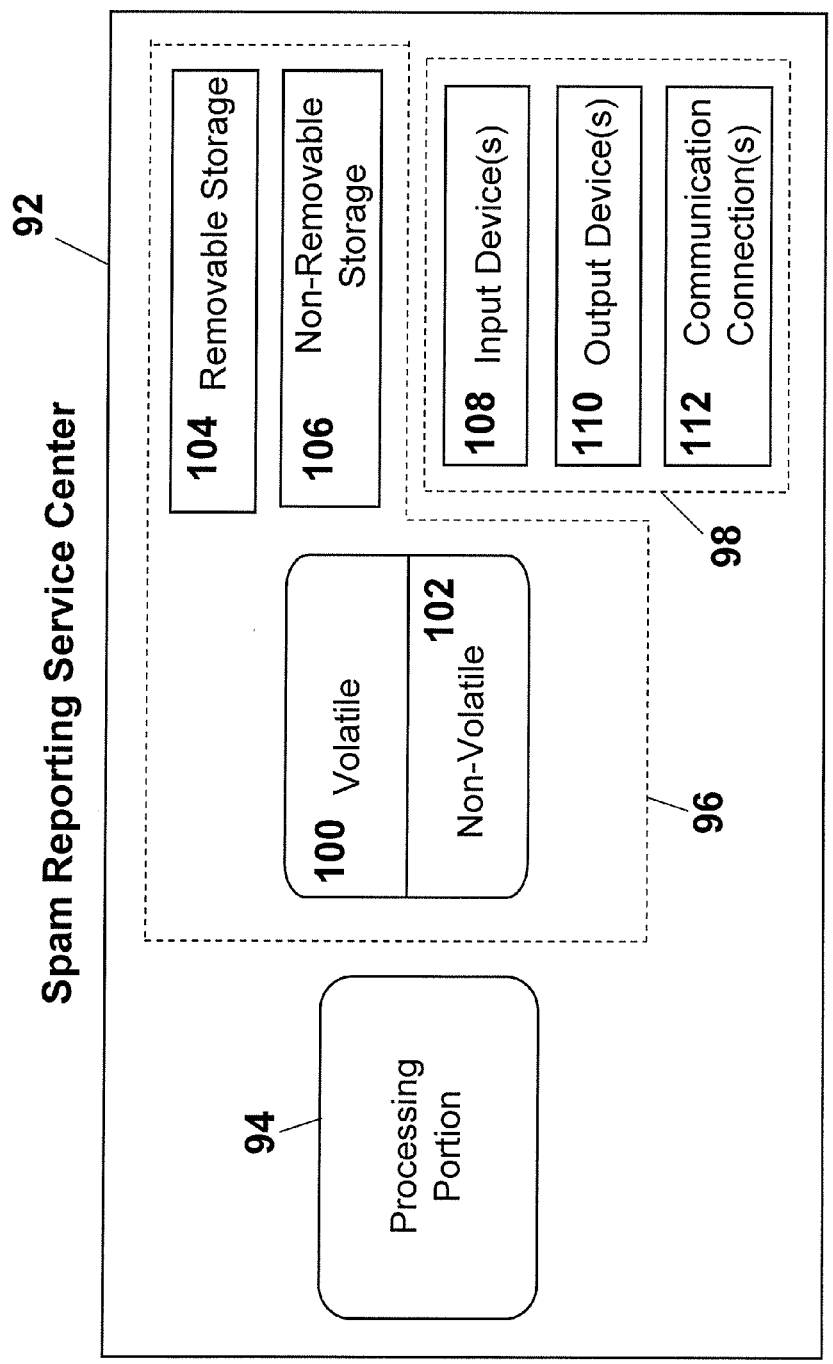
FIG. 8 is a block diagram of an example spam reporting service center.

As described above, spam can be reported to a network spam reporting service center. FIG. 8 is a block diagram of an example spam reporting service center 92. When used in conjunction with a network, the functionality utilized in the spam reporting service center 92 to implement on-demand spam reporting from a mobile device can reside in any one or combination of network entities. The spam reporting service center 92 depicted in FIG. 8 represents any appropriate communications network entity, or combination of communications network entities, such as, for example, a dedicated processor, server, gateway, database, or combination thereof. In an example configuration, the spam reporting service center 92 comprises a component or various components of a cellular broadcast system wireless network, such as, for example, a gateway, a base station, a mobile switching center, a service control point, an authentication center, a domain name server, a home location register, a visitor location register, an equipment identity register, a subscriber location function server, a home subscriber server, an IP multimedia system server, an application server, a service control point server, etc., or any combination thereof. It is emphasized that the block diagram depicted in FIG. 8 is exemplary and not intended to imply a specific implementation or configuration. Accordingly, the spam reporting service center 92 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the spam reporting service center 92 comprises a processing portion 94, a memory portion 96, and an input/output portion 98. The processing portion 94, memory portion 96, and input/output portion 98 are coupled together (coupling not shown in FIG. 8) to allow communications therebetween. The input/output portion 98 is capable of receiving and/or providing information from/to a device (e.g., device 12) configured to provide on-demand spam reporting. For example, the input/output portion 96 is capable of sending content, receiving a spam report, providing feedback to a mobile device, or any combination thereof, as described above. In various configurations, the input/output portion 98 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In various configurations, the input/output portion 98 can receive and/or provide information wirelessly, via a wired connection, or a combination thereof.

The processing portion 94 is capable of performing functions associated with on-demand spam reporting from a device. That is, the device can perform functions internally (by the device) and/or utilize the spam reporting service center 92 to perform functions. For example, the processing portion is capable of processing the report to determine the nature of the content. The processing portion 94 is capable of analyzing content to determine if the content contains spam or is suspected of containing spam, processing a spam report, parsing a spam report, or any combination thereof.

The memory portion 96 can store any information utilized in conjunction with on-demand spam reporting from a device. Thus, the device can utilize its internal memory/storage capabilities and/or utilize memory/storage capabilities of the spam reporting service center 92. For example, the memory portion 96 is capable of storing subscriber data (e.g., the International Mobile Subscriber Identity (IMSI)), selected message data (e.g., Message Content Type(s), Original Sender's address, Last Sender's address), the message (content) as received, and disposition instruction (e.g., Block further messages from the original and/or last sender, report only), or any combination thereof. Depending upon the exact configuration and type of spam reporting service center, the memory portion 96 can include computer readable storage media that is volatile 100 (such as dynamic RAM), non-volatile 102 (such as ROM), or a combination thereof. The spam reporting service center 92 can include additional storage, in the form of computer readable storage media (e.g., removable storage 104 and/or non-removable storage 106) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the spam reporting service center 92. Computer readable storage media is an article of manufacture and should not be construed as a signal.

The spam reporting service center 92 also can contain communications connection(s) 112 that allow the spam reporting service center 92 to communicate with other devices, network entities, or the like. A communications connection(s) can comprise communication media. Computer readable communication media typically embody computer readable instructions, data structures, program modules or other data, that can be transported via a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The spam reporting service center 92 also can include input device(s) 108 such as keyboard, mouse, pen, voice input device, touch input device, etc. Output device(s) 110 such as a display, speakers, printer, etc. also can be included.

As described above, a device configured to provide on-demand spam reporting can be utilized in a wireless communications network, and the spam reporting service center can comprise any appropriate portion of a wireless communications network. Various example network configurations are described below, showing how a device that is configured to provide on-demand spam reporting can be utilized therewith.

The following description sets forth some exemplary telephony radio networks and non-limiting operating environments in which on-demand spam reporting can be implemented. The below-described operating environments should be considered non-exhaustive, however, and thus the below-described network architectures merely show how on-demand spam reporting can be incorporated into existing network structures and architectures. It can be appreciated, however, that on-demand spam reporting can be incorporated into existing and/or future alternative architectures for communication networks as well.

The Global System for Mobile communications (GSM) is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), 4G Services such as Long Term Evolution (LTE), etc., as well as to other network services that become available in time. In this regard, the techniques of on-demand spam reporting can be applied independently of the method of data transport, and do not depend on any particular network architecture, or underlying protocols.

Figure 9:
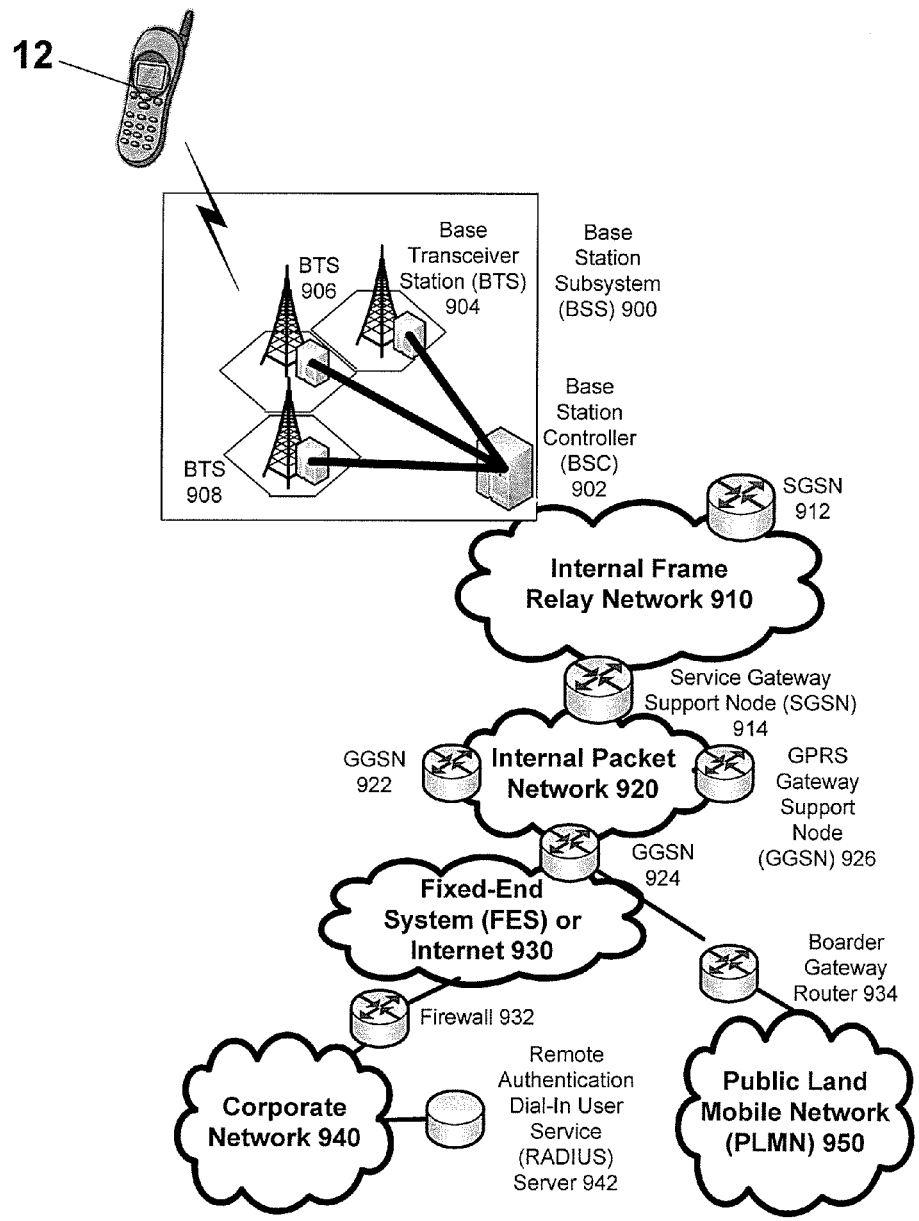
FIG. 9 depicts an overall block diagram of an exemplary packet-based mobile cellular network environment, such as a GPRS network, in which a communications device configured to provide on-demand spam reporting can be utilized.

FIG. 9 depicts an overall block diagram of an exemplary packet-based mobile cellular network environment, such as a GPRS network, in which device 12 configured to provide on-demand spam reporting can be utilized. In such an environment, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. As depicted in FIG. 9, the device 12 is in communications with BSS 900. BTSs 904, 906, 908, etc. are the access points where users of packet-based mobile devices become connected to the wireless network. In exemplary fashion, the packet traffic originating from user devices (e.g., device 12) is transported via an over-the-air interface to a BTS 908, and from the BTS 908 to the BSC 902. Base station subsystems, such as BSS 900, are a part of internal frame relay network 910 that can include Service GPRS Support Nodes ("SGSN") such as SGSN 912 and 914. Each SGSN is connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 950, corporate intranets 940, or Fixed-End System ("FES") or the public Internet 930. As illustrated, subscriber corporate network 940 may be connected to GGSN 924 via firewall 932; and PLMN 950 is connected to GGSN 924 via boarder gateway router 934. The Remote Authentication Dial-In User Service ("RADIUS") server 942 may be used for caller authentication when a user of a mobile cellular device calls corporate network 940.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 10:
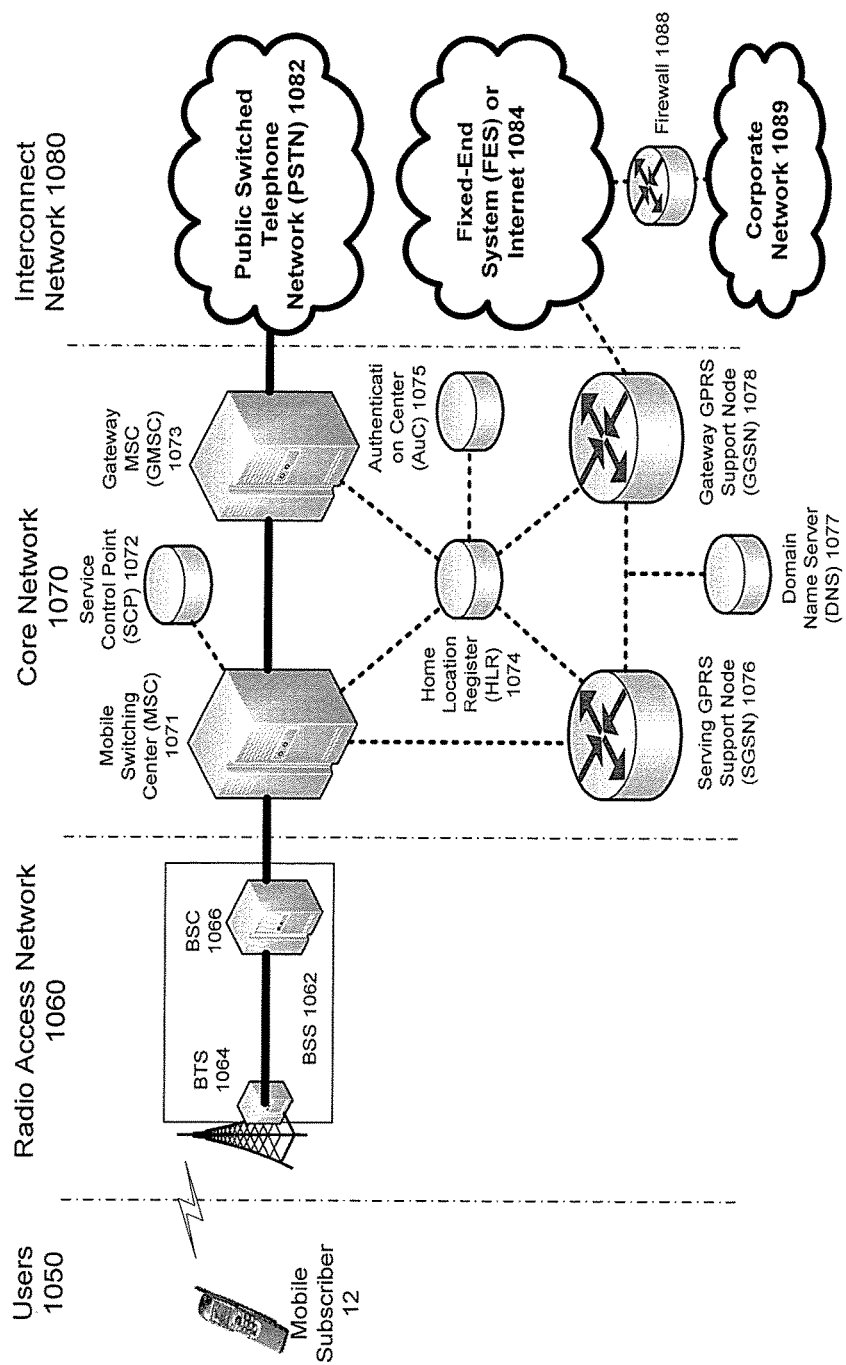
FIG. 10 illustrates an architecture of a typical GPRS network in which a communications device configured to provide on-demand spam reporting can be utilized.

FIG. 10 illustrates an architecture of a typical GPRS network in which the device 12 configured to provide on-demand spam reporting can be utilized. The architecture depicted in FIG. 10 is segmented into four groups: users 1050, radio access network 1060, core network 1070, and interconnect network 1080. Users 1050 comprise a plurality of end users. Note, device 12 is referred to as a mobile subscriber in the description of network shown in FIG. 10.

In an example embodiment, the device depicted as mobile subscriber 12 comprises a mobile device. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 10, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example, from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when mobile subscriber 12 initiates the attach process by turning on the network capabilities of the mobile device, an attach request is sent by mobile subscriber 12 to SGSN 1076. The SGSN 1076 queries another SGSN, to which mobile subscriber 12 was attached before, for the identity of mobile subscriber 12. Upon receiving the identity of mobile subscriber 12 from the other SGSN, SGSN 1076 requests more information from mobile subscriber 12. This information is used to authenticate mobile subscriber 12 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 12 was attached before, to cancel the location process for mobile subscriber 12. HLR 1074 then notifies SGSN 1076 that the location update has been performed. At this time, SGSN 1076 sends an Attach Accept message to mobile subscriber 12, which in turn sends an Attach Complete message to SGSN 1076.

After attaching itself with the network, mobile subscriber 12 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 12. The mobile subscriber 12 uses an algorithm to send the user identification (ID) and password to SGSN 1076. The SGSN 1076 uses the same algorithm and compares the result. If a match occurs, SGSN 1076 authenticates mobile subscriber 12.

Next, the mobile subscriber 12 establishes a user session with the destination network, corporate network 1089, by going through a Packet Data Protocol ("PDP") activation process. Briefly, in the process, mobile subscriber 12 requests access to the Access Point Name ("APN"), for example, UPS.com, and SGSN 1076 receives the activation request from mobile subscriber 12. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1089. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 12.

Once activated, data packets of the call made by mobile subscriber 12 can then go through radio access network 1060, core network 1070, and interconnect network 1080, in a particular fixed-end system or Internet 1084 and firewall 1088, to reach corporate network 1089.

Thus, network elements that can invoke the functionality of a device configured to provide on-demand spam reporting can include but are not limited to Gateway GPRS Support Node tables, Fixed End System router tables, firewall systems, VPN tunnels, and any number of other network elements as required by the particular digital network.

Figure 11:
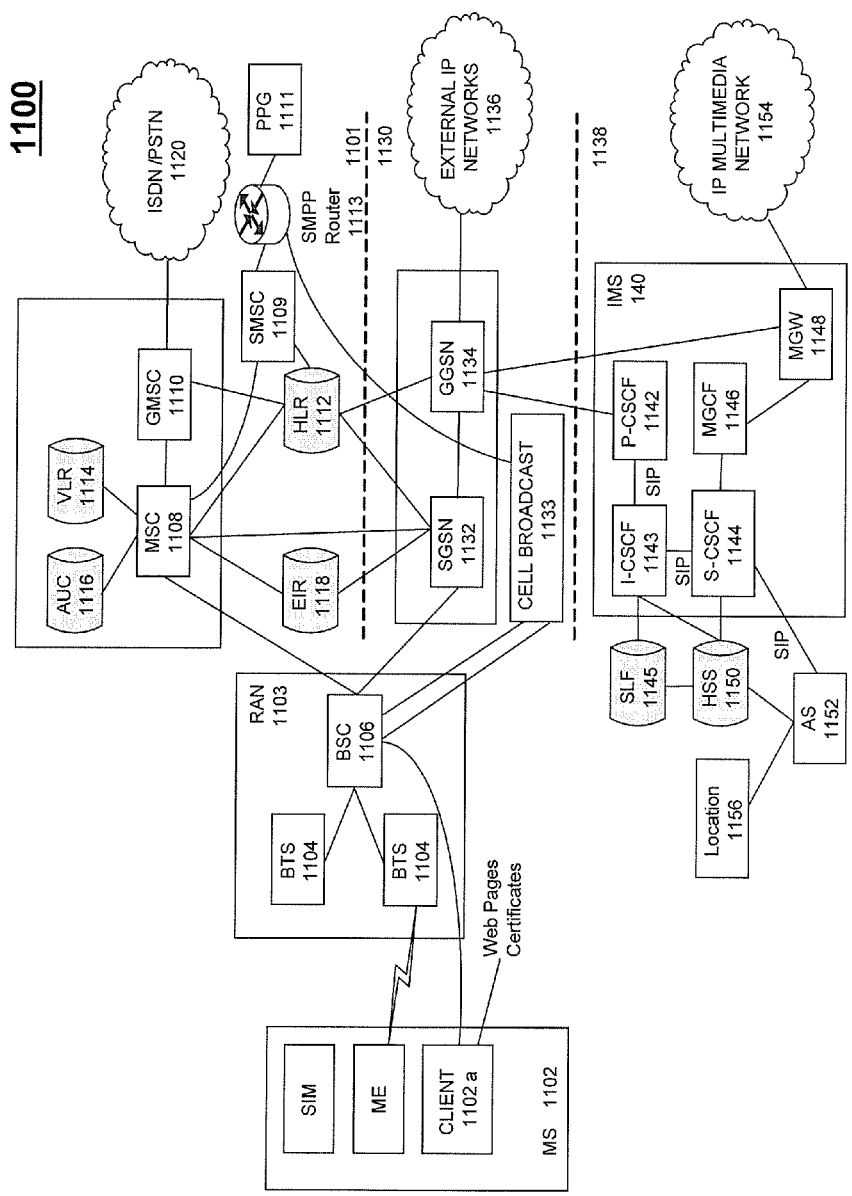
FIG. 11 illustrates an exemplary block diagram view of a GSM/GPRS/IP multimedia network architecture within which a device configured to provide on-demand spam reporting can be utilized.

FIG. 11 illustrates an exemplary block diagram view of a GSM/GPRS/IP multimedia network architecture 1100 within which a device configured to provide on-demand spam reporting can be utilized. As illustrated, architecture 1100 of FIG. 11 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer (e.g., device 12) that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR)

1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS can monitor pages for a circuit switched network while received data and vice versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of on-demand spam reporting have been described in connection with various computing devices/processor, the underlying concepts can be applied to any computing device, processor, or system capable of utilizing and/or implementing on-demand spam reporting. The various techniques described herein can be implemented in connection with hardware or software or, where appropriate, with a combination of both. Thus, the methods and apparatuses for the utilization of on-demand spam reporting, or certain aspects or portions thereof, can take the form of program code (i.e., instructions) embodied in tangible storage media, such as floppy diskettes, CD-ROMs, hard drives, or any other machine-readable storage medium, wherein, when the program code is loaded into and executed by a machine, such as a computer, the machine becomes an apparatus for the utilization of on-demand spam reporting. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for on-demand spam reporting also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the utilization of on-demand spam reporting. When implemented on a general-purpose processor, the program code combines with the processor to provide a unique apparatus that operates to invoke the functionality of on-demand spam reporting. Additionally, any storage techniques used in connection with the utilization of on-demand spam reporting can invariably be a combination of hardware and software.

While on-demand spam reporting has been described in connection with the various embodiments of the various figures, it is to be understood that other similar embodiments can be used or modifications and additions can be made to the described embodiment for performing the same function of utilizing on-demand spam reporting without deviating therefrom. For example, one skilled in the art will recognize that the utilization of on-demand spam reporting as described in the present application may apply to any environment, whether wired or wireless, and may be applied to any number of such devices connected via a communications network and interacting across the network. Therefore, on-demand spam reporting should not be limited to any single embodiment, but rather should be construed in breadth and scope in accordance with the appended claims.

What is claimed:

1. A method implemented in a communications device comprising: receiving, by the communications device, content comprising a content type, an address of a last sender, and an address of an original sender;

providing, by the communications device, an indication of the content type, the address of the last sender of the content, and the address of the original sender of the content;

receiving, from a user interface in the communications device, a trigger, receipt of the trigger being indicative of the content type comprising unwanted information;

determining, by the communications device, whether the content type comprises a short message service content type; determining, by the communications device, whether the content type comprises a multimedia message service content type;

determining, by the communications device, whether the content type comprises an email content type;

determining, by the communications device, whether the content type comprises a voice mail content type; determining, by the communications device, whether the content type comprises a video voice mail content type;

determining, by the communications device, whether the content type comprises an advertisement content type;

respectively encapsulating each of the determined content types by encrypting or obfuscating the content to create an encapsulated content;

providing the encapsulated content to a voice mail client in the communications device;

generating, in a report spam client, a report comprising the encapsulated content types, the address of the original sender, the address of the last sender, and a disposition instruction for each of the encapsulated content types, the disposition instruction comprising blocking further content of the encapsulated content types from at least one of the address of the original sender and the address of the last sender;

providing a spam reporting option as part of an audio user interface provided by the voicemail client;

and providing, by the communications device, the report to a network spam reporting service center.

2. The method of claim 1, wherein the report further comprises an International Mobile Subscriber Identity (IMSI) of a user of the communications device.

3. The method of claim 1, wherein the address of the last sender is the same as the address of the original sender.

4. The method of claim 1, wherein the address of the original sender or the address of the last sender comprises an IP address.

5. The method of claim 1, wherein the address of the original sender or the address of the last sender comprises a Fully-Qualified Domain Name (FQDN).

6. The method of claim 1, further comprising formatting, by the communications device, the report according to a defined protocol.

7. The method of claim 1, wherein the report further comprises an envelope, the envelope comprising the address of a network spam reporting service center.

8. A communications device comprising:
a processor; and
memory coupled to the processor, the memory comprising instructions that when executed by the processor cause the processor to effectuate operations comprising:
receiving content comprising a content type, an address of a last sender, and an address of an original sender;
providing an indication of the content type, the address of the last sender of the content, and the address of the original sender of the content;
receiving from a user interface in the communications device a trigger, receipt of the trigger being indicative of the content type comprising unwanted information;
determining whether the content type comprises a short message service content type;
determining whether the content type comprises a multimedia message service content type;
determining whether the content type comprises an email content type;
determining whether the content type comprises a voice mail content type;
determining whether the content type comprises a video voice mail content type;
determining the content type comprises an advertisement content type;
respectively encapsulating each of the determined content types by encrypting or obfuscating the content to create an encapsulated content;
providing the encapsulated content to a voice mail client in the communications device;
generating a report comprising the encapsulated content types, the address of the original sender, the address of the last sender, and a disposition instruction for each of the encapsulated content types, the disposition instruction comprising blocking further content of the encapsulated content types from at least one of the address of the original sender and the address of the last sender;
providing a spam reporting option as part of an audio user interface provided by the voicemail client and providing the report.

9. The device of claim 8, wherein the report further comprises an International Mobile Subscriber Identity (IMSI) of a user of the device.

10. The device of claim 8, wherein the address of the last sender is the same as the address of the original sender.

11. The device of claim 8, further comprising:
a plurality of clients, each client of the plurality of clients configured to process content of a respective content type, wherein content of content type is encapsulated by a respective client of the content type; and
a report client configured to receive the encapsulated content and generate the report.

12. The device of claim 8, the operations further comprising providing the report to a spam report servicing center of a communications network.

13. A computer-readable storage medium, the storage medium not being a propagating signal, the storage medium comprising instructions to cause a device to effectuate operations comprising:
receiving content comprising a content type, an address of a last sender, and an address of an original sender;
providing an indication of the content type, the address of the last sender of the content, and the address of the original sender of the content;
receiving from a user interface in the device a trigger, receipt of the trigger being indicative of the content type comprising unwanted information;
determining whether the content type comprises a short message service content type;
determining whether the content type comprises a multimedia message service content type;
determining whether the content type comprises an email content type;
determining whether the content type comprises a voice mail content type;
determining whether the content type comprises a video voice mail content type;
determining the content type comprises an advertisement content type;
respectively encapsulating each of the determined content types by encrypting or obfuscating the content to create an encapsulated content;
providing the encapsulated content to a voice mail client in the device;
generating in the voice mail client a report comprising the encapsulated content types, the address of the original sender, the address of the last sender, and a disposition instruction for each of the encapsulated content types, the disposition instruction comprising blocking further content of the encapsulated content types from at least one of the address of the original sender and the address of the last sender; and
providing a spam reporting option as part of an audio user interface provided by the voicemail client and providing the report.

14. The computer-readable storage medium of claim 13, wherein the report further comprises an International Mobile Subscriber Identity (IMSI) of a user of the device.

15. The computer-readable storage medium of claim 13, wherein the address of the last sender is the same as the address of the original sender.

16. The computer-readable storage medium of claim 13, wherein at least a portion of the computer readable storage medium comprises at least one of a subscriber identity module (SIM) or universal integrated circuit card (UICC) of the device.

17. The computer-readable storage medium of claim 13, wherein the address of the original sender or the address of the last sender comprises an IP address.

18. The computer-readable storage medium of claim 13, wherein the address of the original sender or the address of the last sender comprises a Fully-Qualified Domain Name (FQDN).

19. The computer-readable storage medium of claim 13, the operations further comprising formatting the report according to a defined protocol.

20. The computer-readable storage medium of claim 13, wherein the report further comprises an envelope, the envelope comprising the address of a network spam reporting service center.

* * * * *